United States Patent
Li et al.

(10) Patent No.: US 10,084,235 B2
(45) Date of Patent: *Sep. 25, 2018

(54) FEEDING MATCHING APPARATUS OF MULTIBAND ANTENNA, MULTIBAND ANTENNA, AND RADIO COMMUNICATION DEVICE

(71) Applicant: Huawei Device (Dongguan) Co., Ltd., Dongguan (CN)

(72) Inventors: Yuanpeng Li, Beijing (CN); Hanyang Wang, Reading (GB); Yafang Yu, Beijing (CN); Meng Hou, Shanghai (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,039

(22) Filed: Aug. 10, 2017

(65) Prior Publication Data

US 2017/0338560 A1    Nov. 23, 2017

Related U.S. Application Data

(63) Continuation of application No. 15/229,829, filed on Aug. 5, 2016, now Pat. No. 9,761,942, which is a
(Continued)

(51) Int. Cl.
*H01Q 1/38* (2006.01)
*H01Q 5/328* (2015.01)
(Continued)

(52) U.S. Cl.
CPC ............. *H01Q 5/328* (2015.01); *H01Q 1/241* (2013.01); *H01Q 1/48* (2013.01); *H01Q 5/314* (2015.01);
(Continued)

(58) Field of Classification Search
CPC ...... H04B 1/18; H04B 1/0458; H04B 1/0057; H01Q 5/314; H01Q 5/335; H01Q 9/04;
(Continued)

(56) References Cited

U.S. PATENT DOCUMENTS 9,413,410 B2 *   8/2016   You .................... H04B 15/00
2005/0184909 A1  8/2005   Tchistiakov et al.
(Continued)

FOREIGN PATENT DOCUMENTS

CN    102318138 A    1/2012
CN    202435391 U    9/2012

OTHER PUBLICATIONS

U.S. Appl. No. 15/229,829, filed Aug. 5, 2016.
U.S. Appl. No. 14/143,367, filed Dec. 30, 2013.

*Primary Examiner* — Huedung Mancuso
(74) *Attorney, Agent, or Firm* — Leydig, Voit & Mayer, Ltd.

(57) ABSTRACT

The present disclosure relates to the field of antenna technologies and discloses a feeding matching apparatus of a multiband antenna, a multiband antenna, and a radio communication device to improve a bandwidth and efficiency of a lower frequency band. The feeding matching apparatus of a multiband antenna includes: a grounding portion; a feeding portion connected to a signal source, where a signal of the signal source is input into the feeding portion; and two or more ground cable branches with different lengths, where one end of each ground cable branch is electrically connected to the feeding portion, the other end is electrically connected to the grounding portion, at least one ground cable branch is connected in series to a signal filtering component, and the signal filtering component is capable of preventing a signal lower than a frequency point corresponding to the signal filtering component from passing through it.

20 Claims, 5 Drawing Sheets

Related U.S. Application Data continuation of application No. 14/143,367, filed on Dec. 30, 2013, now Pat. No. 9,437,928, which is a continuation of application No. PCT/CN2013/070557, filed on Jan. 16, 2013.

(51) Int. Cl.

| | | |
|---|---|---|
| *H01Q 9/04* | (2006.01) | |
| *H01Q 13/08* | (2006.01) | |
| *H01Q 1/48* | (2006.01) | |
| *H01Q 1/24* | (2006.01) | |
| *H01Q 5/335* | (2015.01) | |
| *H04B 1/18* | (2006.01) | |
| *H04B 1/04* | (2006.01) | |
| *H04B 1/00* | (2006.01) | |
| *H01Q 5/314* | (2015.01) | |
| *H01P 5/12* | (2006.01) | |
| *H01P 1/213* | (2006.01) | |
| *H01P 1/203* | (2006.01) | |

(52) U.S. Cl.
CPC ............... *H01Q 5/335* (2015.01); *H01Q 9/04* (2013.01); *H01Q 13/08* (2013.01); *H04B 1/0057* (2013.01); *H04B 1/0458* (2013.01); *H04B 1/18* (2013.01); *H01P 1/2039* (2013.01); *H01P 1/2135* (2013.01); *H01P 5/12* (2013.01)

(58) Field of Classification Search
CPC ......... H01Q 5/328; H01P 1/2039; H01P 5/12; H01P 1/2135
USPC .................. 343/850, 852, 860, 702, 700 MS
See application file for complete search history.

(56) References Cited

U.S. PATENT DOCUMENTS

| | | |
|---|---|---|
| 2006/0097918 A1 | 5/2006 | Oshiyama et al. |
| 2008/0238789 A1 | 10/2008 | Wilcox |
| 2009/0278755 A1 | 11/2009 | Shoji |
| 2010/0033397 A1 | 2/2010 | Narasimhan et al. |
| 2010/0207832 A1 | 8/2010 | Ying et al. |
| 2012/0154222 A1 | 6/2012 | Oh et al. |
| 2013/0135157 A1 | 5/2013 | Tsou et al. |
| 2013/0169491 A1 | 7/2013 | Montgomery et al. |
| 2016/0013817 A1* | 1/2016 | Park ....................... H01Q 1/243 455/522 |

* cited by examiner

FEEDING MATCHING APPARATUS OF MULTIBAND ANTENNA, MULTIBAND ANTENNA, AND RADIO COMMUNICATION DEVICE

CROSS-REFERENCE TO RELATED APPLICATIONS

This application is a continuation of U.S. patent application Ser. No. 15/229,829, filed on Aug. 5, 2016, which is a continuation of U.S. patent application Ser. No. 14/143,367, filed on Dec. 30, 2013, now U.S. Pat. No. 9,437,928, which is a continuation of International Patent Application No. PCT/CN2013/070557, filed on Jan. 16, 2013. All of the aforementioned patent applications are hereby incorporated by reference in their entireties.

TECHNICAL FIELD

The present disclosure relates to the field of antenna technologies, and in particular, to a feeding matching apparatus of a multiband antenna, a multiband antenna, and a radio communication device.

BACKGROUND

LTE (Long Term Evolution) is an evolution of 3GPP (The 3rd Generation Partnership Project) and a transition between the 3G (The 3rd Generation) technologies and the 4G (The 4th Generation) technologies. As a global standard for 3.9G (The 3.9 Generation), it further improves and strengthens air access technologies of the 3G. It adopts OFDM (Orthogonal Frequency Division Multiplexing) and MIMO (Multiple-Input Multiple-Output) as standards for evolution of its radio network. Currently, the LTE is gradually being considered as a mainstream technology for evolving to the 4G.

At present, in the field of mobile communication terminal products, a miniaturized LTE antenna design scheme that meets a lower frequency band, a higher bandwidth, and a higher performance is required to implement LTE technologies, particularly, in a frequency spectrum range of a low frequency band. In the conventional art, an LTE antenna design scheme may adopt, for example, a structure of an IFA (Inverted F Antenna). Multiple resonant branches of the IFA are printed on a PCB (Printed Circuit Board), and they and a longer ground cable that matches a low frequency band are connected in parallel to a feeding point. Although the ground cable can match the low frequency band, which increases a bandwidth of a low frequency band and improves efficiency of the low frequency band, this deteriorates a bandwidth and efficiency of a high frequency band. In the conventional art, a switch antenna also exists. Multiple different matching circuits are printed on the PCB, and each matching circuit matches a frequency band. The antenna is capable of operating in different frequency bands through a switch. However, the switch has an impedance effect and the introduction of the switch results in insertion loss. This affects the bandwidth and efficiency of the antenna when it operates in a low frequency band.

SUMMARY

Embodiments of the present disclosure provide a feeding matching apparatus of a multiband antenna, a multiband antenna, and a radio communication device, which can improve a bandwidth and efficiency of a lower frequency band and further improve a bandwidth and efficiency of a higher frequency band.

To achieve the preceding objectives, the embodiments of the present disclosure adopt the following technical solutions:

According to a first aspect, the present disclosure provides a feeding matching apparatus of a multiband antenna, including:

a grounding portion;

a feeding portion connected to a signal source, where a signal of the signal source is input into the feeding portion; and two or more ground cable branches with different lengths, where one end of each ground cable branch is electrically connected to the feeding portion, the other end is electrically connected to the grounding portion, at least one ground cable branch is connected in series to a signal filtering component, and the signal filtering component is capable of preventing a signal lower than a frequency point corresponding to the signal filtering component from passing through it.

In a first possible implementation manner, in combination with a possible implementation manner of the first aspect, the signal filtering component is a high-pass filter.

In a second possible implementation manner, in combination with the first possible implementation manner, the high-pass filter is an inductor.

In a third possible implementation manner, in combination with a possible implementation manner of the first aspect, the signal filtering component is a band-pass filter.

In a fourth possible implementation manner, in combination with the third possible implementation manner, the band-pass filter is an open-circuit line led from the ground cable branch.

In a fifth possible implementation manner, in combination with the possible implementation manner of the first aspect, the at least two ground cable branches are separately connected in series to one signal filtering component, a frequency point corresponding to a signal filtering component in a ground cable branch with a shorter length is higher than a frequency point corresponding to a signal filtering component in a ground cable branch with a longer length, and the signal filtering components to which the at least two ground cable branches are connected in series are high-pass filters or band-pass filters.

In a sixth possible implementation manner, in combination with the first aspect or any one of the first to the fourth possible implementation manners, the multiband antenna is a dual-band antenna, the feeding portion is electrically connected to two ground cable branches with different lengths, the shorter ground cable branch is connected in series to one signal filtering component, so that the shorter ground cable branch matches one frequency band of the dual-band antenna, and simultaneously, the longer ground cable branch matches the other frequency band of the dual-band antenna.

In a seventh possible implementation manner, in combination with the first aspect or any one of the first to the fifth possible implementation manners, each ground cable branch is connected in series to one signal filtering component, and frequency bands of signals that pass through each filtering component are different, so that the multiple ground cable branches separately and simultaneously match one frequency band of the multiband antenna.

According to a second aspect, the present disclosure further provides a multiband antenna, including one or more radiating portions with different lengths and the feeding matching apparatus of a multiband antenna in any one of the preceding possible implementation manners, where each radiating portion is configured to transmit a signal to a feeding portion in the feeding matching apparatus of a multiband antenna and receive a signal transmitted from the feeding portion.

In a first possible implementation manner of the second aspect, in combination with a possible implementation manner of the second aspect, a radiating portion with a shorter length matches one or more ground cable branches with a shorter length, and a radiating portion with a longer length matches one or more ground cable branches with a longer length.

According to a third aspect, the present disclosure further provides a radio communication device, including the aforementioned multiband antenna.

The feeding matching apparatus of a multiband antenna, the multiband antenna, and the radio communication device that are provided in the embodiments of the present disclosure include a grounding portion and a feeding portion. Two or more ground cable branches with different lengths are electrically connected between the feeding portion and the grounding portion, and at least one ground cable branch is connected in series to a signal filtering component, where the signal filtering component is capable of preventing a signal lower than a frequency point (that is, the lowest cut-off frequency point) corresponding to the signal filtering component from passing through it. When the multiband antenna needs to receive or transmit a signal, more currents flow into a ground cable branch with a shorter length because the ground cable branch with a shorter length has lower impedance. In this way, a signal first passes through the ground cable branch with a shorter length. When a signal reaches the ground cable branch that is connected in series to the signal filtering component, the ground cable branch is capable of enabling a signal in a higher frequency band to pass and preventing a signal in a lower frequency band from passing through it. Therefore, the signal in the lower frequency band will pass through other ground cable branches longer than the ground cable branch. In this way, the lower frequency band matches a longer ground cable branch, and the higher frequency band matches a shorter ground cable branch. In addition, the better the matching between an antenna frequency and the length of a ground cable branch of the feeding matching apparatus is (that is, the longer the ground cable branch is, the lower a matching frequency is; or the shorter the ground cable branch is, the higher a matching frequency is), the higher a bandwidth of a certain frequency band is and the better operating efficiency is. Therefore, according to the embodiments of the present disclosure, the antenna not only has a higher bandwidth and better operating efficiency when it operates in a lower frequency band but also has a higher bandwidth and better operating efficiency when it operates in a higher frequency band.

BRIEF DESCRIPTION OF DRAWINGS

To illustrate the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

Signs on accompanying drawings:
1—grounding portion, 2—feeding portion, 3—signal filtering component, 30—open-circuit line, 4a and 4b—radiating portions, 5—antenna, 6—radio frequency circuit (RF circuit), 7—processing circuit, and 8—storage circuit

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person skilled in the art based on the embodiments of the present disclosure without making any creative effort shall fall within the protection scope of the present disclosure.

Figure 1:
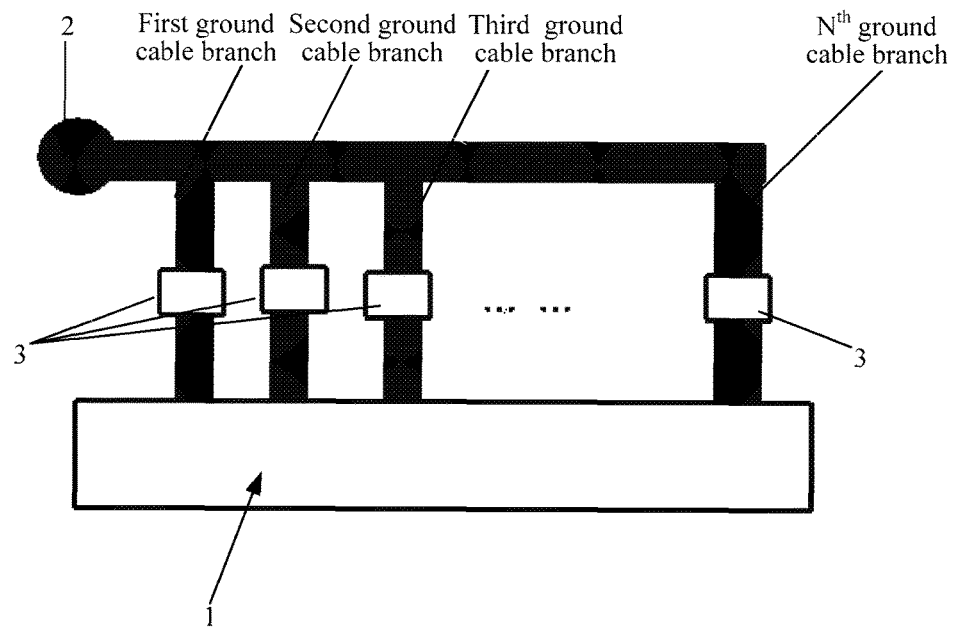
FIG. 1 is a schematic diagram of a feeding matching apparatus of a multiband antenna according to an embodiment of the present disclosure.

In a first aspect, FIG. 1 shows a feeding matching apparatus of a multiband antenna according to an embodiment of the present disclosure. The feeding matching apparatus of a multiband antenna includes:

a grounding portion 1;

a feeding portion 2 connected to a signal source, where a signal of the signal source is input into the feeding portion 2; and two or more ground cable branches with different lengths, where one end of each ground cable branch is electrically connected to the feeding portion 2, the other end is electrically connected to the grounding portion 1, at least one ground cable branch is connected in series to a signal filtering component 3, and the signal filtering component is capable of preventing a signal lower than a frequency point (that is, the lowest cut-off frequency point) corresponding to the signal filtering component from passing through it. For ease of description, a frequency band higher than the frequency point is called a higher frequency band, and a frequency band lower than the frequency point is called a lower frequency band in the following.

When the multiband antenna needs to receive or transmit a signal, more currents flow into a ground cable branch with a shorter length because the ground cable branch with a shorter length has lower impedance. In this way, a signal first passes through the ground cable branch with a shorter length. When a signal reaches the ground cable branch that is connected in series to the signal filtering component, the ground cable branch is capable of enabling a signal in a higher frequency band to pass and preventing a signal in a lower frequency band from passing through it. Therefore, the signal in the lower frequency band will pass through other ground cable branches longer than the ground cable branch. In this way, the lower frequency band better matches a longer ground cable branch, and the higher frequency band better matches a shorter ground cable branch. In addition, the better the matching between an antenna frequency and the length of a ground cable branch of the feeding matching apparatus is (that is, the longer the ground cable branch is, the lower a matching frequency is; or the shorter the ground cable branch is, the higher a matching frequency is), the higher a bandwidth of a certain frequency band is and the better operating efficiency is. Therefore, according to this embodiment of the present disclosure, the antenna not only has a higher bandwidth and better operating efficiency when it operates in a lower frequency band but also has a higher bandwidth and better operating efficiency when it operates in a higher frequency band.

Optionally, the aforementioned signal filtering component 3 may be a high-pass filter with a high-pass filtering function. The high-pass filter may be one of various high-pass filters. For example, it may be formed by connecting in series a capacitor to an inductor, by connecting in parallel a capacitor to an inductor, by connecting in series the previous two types, by independently using a capacitor or an inductor, or the like.

An inductor is used as an example for description. When an operating frequency of the inductor is greater than its resonant frequency, a high-pass function can be implemented. However, the inductor is only used as an optional solution in this embodiment of the present disclosure, and the aforementioned high-pass filters of other types may be also applied to this embodiment of the present disclosure.

When the signal filtering component 3 is a band-pass filter, a ground cable branch that is connected in series to the band-pass filter is capable of enabling a signal in a certain frequency band to pass, and the ground cable branch can better match the frequency band to further improve a bandwidth and efficiency of the frequency band. If the frequency band is a low frequency band, the bandwidth and efficiency of the low frequency band can be improved, which may enable, for example, an LTE antenna to meet a lower frequency band, a higher bandwidth, and a higher performance. In this way, handheld mobile terminals such as a mobile phone may develop towards an ultrathin, multifunctional, and high battery capacity trend.

Figure 2:
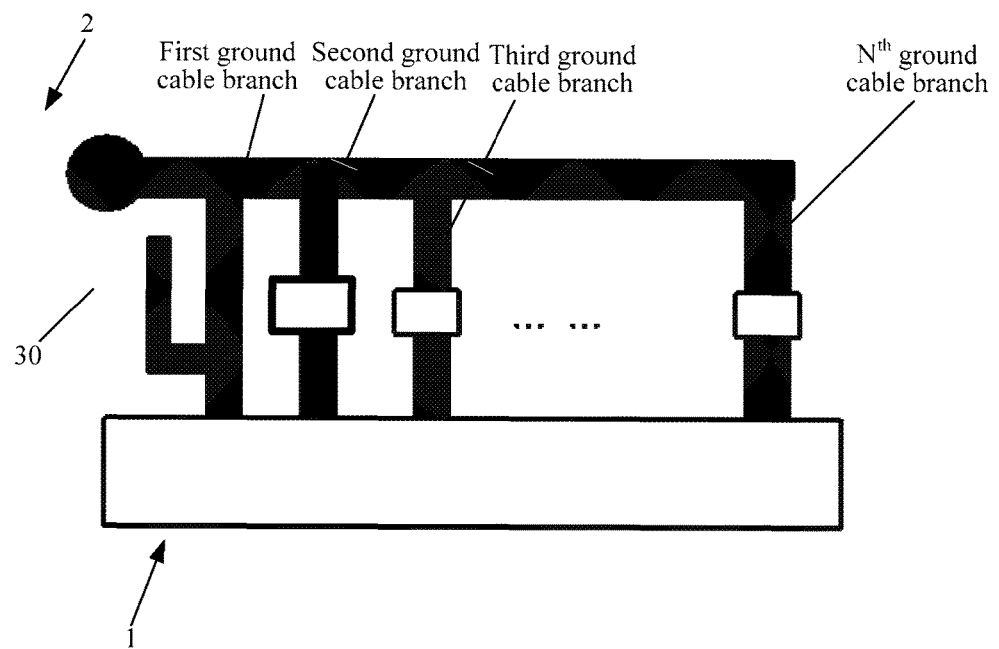
FIG. 2 is a schematic diagram of a feeding matching apparatus of a multiband antenna in which a signal filtering component is an open-circuit line (the open-circuit line is a fold line) according to an embodiment of the present disclosure.

As shown in FIG. 2, an open-circuit line 30 may be further led from the ground cable branch, where the open-circuit line 30 may be a microstrip line. The impedance transformation effect works in a certain frequency band because impedance transformation relates to a frequency. Therefore, a band-pass function can be implemented by using the impedance transformation effect of the open-circuit line 30. Therefore, the open-circuit line 30 can form the band-pass filter.

It should be noted that, if the microstrip line (the open-circuit line 30) has a shorter length, the high-pass filtering function may be also implemented. For example, for a frequency band 1850-1990 MHz (Mega Hertz, megahertz), the length of a microstrip line implementing the band-pass function is 3.7 cm (centimeter), where its thickness is about 0.8 mm (millimeter) and its line width is 1.5 mm. When the length of the microstrip line is less than 3.7 cm, the high-pass function is implemented. Certainly, in the same feeding matching apparatus, except for the length of the open-circuit line, other factors, such as the thickness and the width of the microstrip line and material quality and arrangement position of a microstrip board, should be ensured to remain unchanged, so as to make the microstrip line implement the high-pass or band-pass function.

Figure 3:
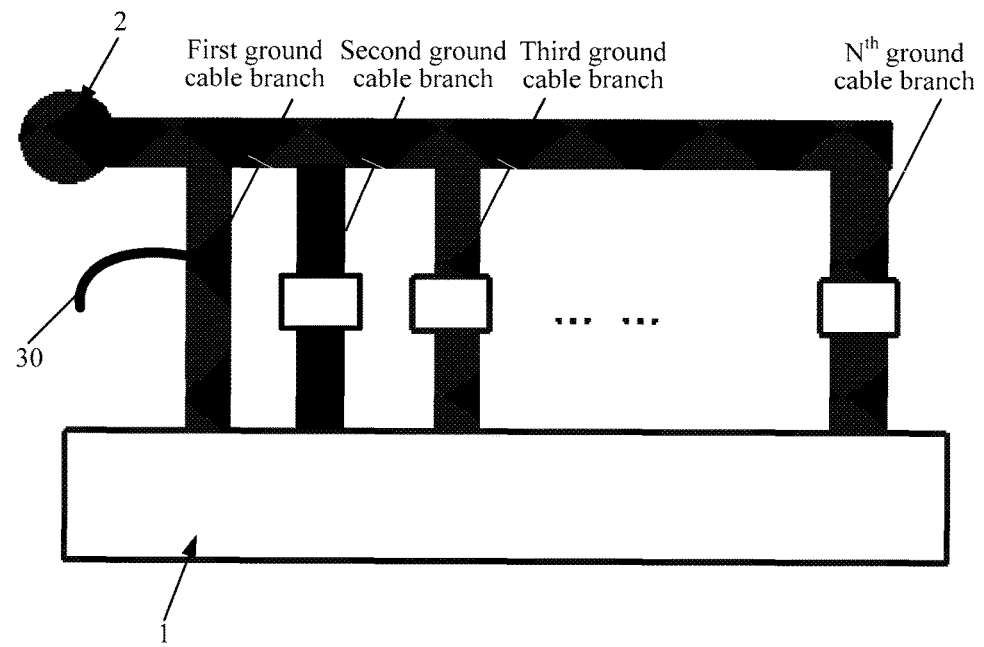
FIG. 3 is a schematic diagram of a feeding matching apparatus of a multiband antenna in which a signal filtering component is an open-circuit line (the open-circuit line is an arc) according to an embodiment of the present disclosure.
Figure 4:
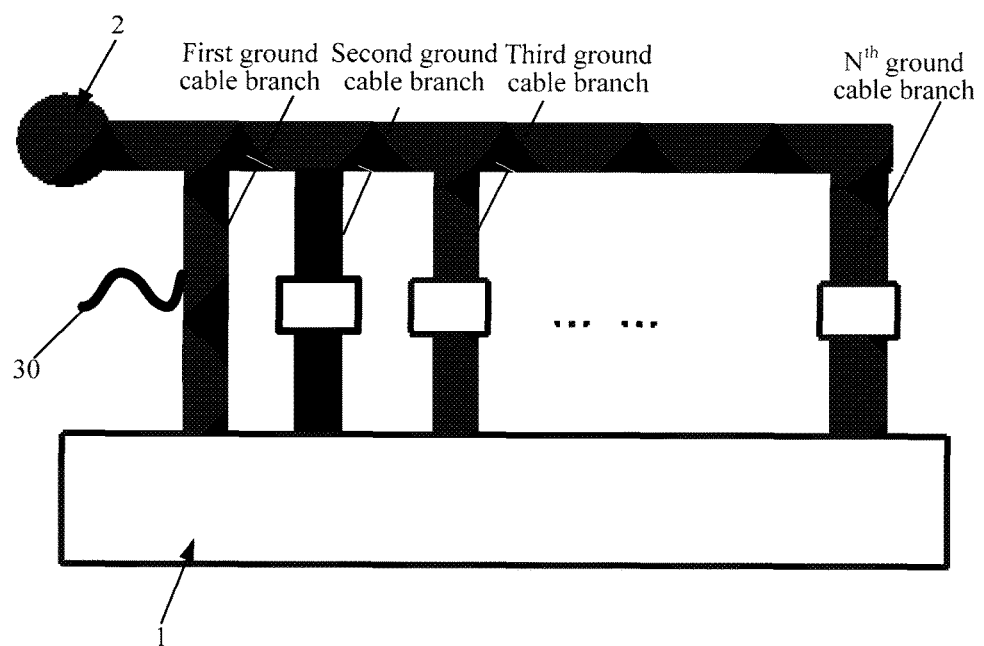
FIG. 4 is a schematic diagram of a feeding matching apparatus of a multiband antenna in which a signal filtering component is an open-circuit line (the open-circuit line is a wavy line) according to an embodiment of the present disclosure.

The open-circuit line is not limited to the fold line in FIG. 2. It may further be an arc shown in FIG. 3, a wavy line shown in FIG. 4, or the like. Specifically, this should be optimized and set according to an actual situation.

Figure 5:
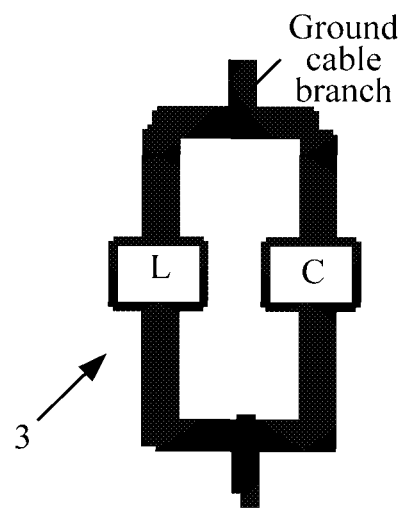
FIG. 5 is a schematic diagram of a feeding matching apparatus of a multiband antenna in which a signal filtering component is an LC circuit according to an embodiment of the present disclosure.

In addition, there are various band-pass filters. For example, the band-pass filter is formed by connecting in series a capacitor to an inductor, by connecting in parallel a capacitor to an inductor, by connecting in series the previous two types, or the like. A signal filtering component 3 shown in FIG. 5 is an LC circuit formed by connecting in parallel the inductor to the capacitor. The band-pass filtering function is implemented by adjusting parameters of the inductor and the capacitor.

If there are multiple ground cable branches separately connected in series to one signal filtering component 3, these multiple signal filtering components 3 may be high-pass filters or band-pass filters. For example, when there are two ground cable branches separately connected in series to one signal filtering component 3, both the two signal filtering components 3 may be any one of the foregoing high-pass filters or any one of the foregoing band-pass filters; or one signal filtering component 3 may be any one of the foregoing high-pass filters and the other signal filtering component 3 is any one of the foregoing band-pass filters.

Figure 6:
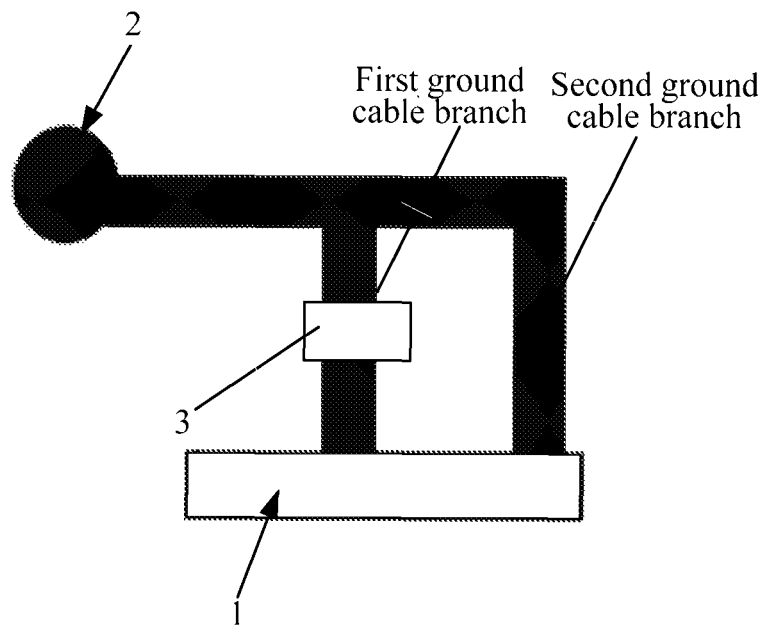
FIG. 6 is a schematic diagram of a feeding matching apparatus of a dual-band antenna.

In an practical application, for example, in an LTE project, when the multiband antenna using the feeding matching apparatus is a dual-band antenna, with reference to the previous content and FIG. 6, it can be known that, the feeding portion 2 is electrically connected to two ground cable branches with different lengths, the shorter ground cable branch (called a first ground cable branch) is connected in series to one signal filtering component 3, so that the shorter ground cable branch matches one frequency band (a high frequency band) in which the dual-band antenna operates, and simultaneously, the longer ground cable branch (called a second ground cable branch) matches the other frequency band (a low frequency band) in which the dual-band antenna operates. For the low frequency band, because the first ground cable branch is connected in series to one signal filtering component 3, a signal in the low frequency band flows into the second ground cable branch. Therefore, the signal in the low frequency band is matched by the longer ground cable branch, so that the antenna has better operating efficiency and a higher bandwidth when it operates in the low frequency band. For the high frequency band, a signal in the high frequency band is capable of passing through the first ground cable branch and the second ground cable branch. Voltages between two ends of the two ground cable branches are the same, and the first ground cable branch has lower impedance because it has a shorter length. Therefore, more currents flow over the first ground cable branch, so that most signals in the high frequency band pass through the first ground cable branch. It can be seen that, the signal in the high frequency band is matched by the shorter ground cable branch, so that the antenna has better operating efficiency and a higher bandwidth when it operates in the high frequency band. In this way, both the bandwidth and efficiency of the low and high frequency bands can be ensured.

When the signal filtering component 3 is an inductor, an inductance value of the inductor can be set to 3.3 nH through debugging. A testing result indicates that, compared with efficiency of a common inverted F antenna in the low frequency band, efficiency of the LTE antenna in the low frequency band can increase by 1 dB, and a bandwidth of the LTE antenna when it operates in the low frequency band is twice as a bandwidth of the common inverted F antenna in the low frequency band. Similarly, compared with those of the common inverted F antenna, efficiency and a bandwidth of the LTE antenna when it operates in the high frequency band significantly increase.

It should be noted that, the aforementioned inductance value 3.3 nH is a matching value obtained through debugging. In addition, the inductance value further may be another matching value. An exact value is obtained through debugging according to a specific situation.

With reference to the previous content, as shown in FIG. 1 or 2, each ground cable branch may be further connected in series to one signal filtering component 3, signals passing through each signal filtering component are different in frequency band, and the frequency band of a signal that can pass through the signal filtering component 3 connected in series to a shorter ground cable branch is higher. For example, multiple frequency bands of the multiband antenna are divided in descending order into a first frequency band, a second frequency band, a third frequency band, . . . , and an $N^{th}$ frequency band (N≤6, it should be noted that, N≤6 is only an optional solution and an exact value is optimized and determined according to an actual situation), and ground cable branches are divided in ascending order into a first ground cable branch, a second ground cable branch, a third ground cable branch, . . . , and an $N^{th}$ ground cable branch. Accordingly, the signal filtering components 3 in the ground cable branches are a first filtering component, a second filtering component, a third filtering component, . . . , and an $N^{th}$ filtering component. When the multiband antenna simultaneously receives or transmits multiple frequency bands, for example, when the first frequency band (that is, the highest frequency band) passes through the first ground cable branch, because the length of the first ground cable branch is the shortest, the first frequency band passes through the first ground cable branch, so that the shortest first ground cable branch matches the first frequency band, and the antenna has a higher bandwidth and better efficiency when it operates in the first frequency band. The second frequency band cannot pass through the first ground cable branch but passes through the second ground cable branch. The second frequency band is lower than the first frequency band; therefore the length of the second ground cable branch matching the second frequency band may be a little longer than the first ground cable branch, so that the second ground cable branch better matches the second frequency band. Therefore, the antenna has a higher bandwidth and better efficiency when it operates in the second frequency band. The third ground cable branch to the $N^{th}$ ground cable branch can separately better match a corresponding third frequency band to an $N^{th}$ frequency band. This is similar to the previous description, and therefore no further details are provided herein. In this way, each ground cable branch separately and simultaneously matches one frequency band, so that multiple frequency bands are simultaneously matched.

If the signal filtering components 3 are band-pass filters, each ground cable branch may let through a frequency band that matches its length, and other frequency bands cannot pass through the ground cable branch. For example, the first frequency band can pass through only the first ground cable branch, the second frequency band can pass through only the second ground cable branch, . . . , and the $N^{th}$ frequency band can pass through only the $N^{th}$ ground cable branch. In this way, the frequency bands do not interfere with each other. In a process of simultaneously matching multiple frequency bands, each frequency band can further have a better bandwidth and efficiency.

Figure 7:
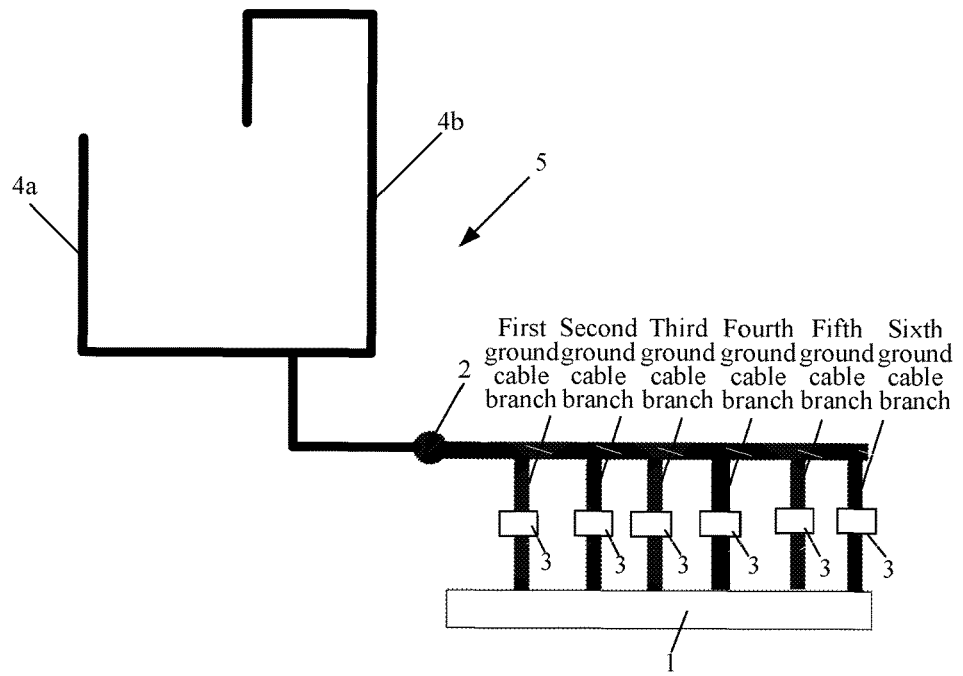
FIG. 7 is a schematic diagram of a multiband antenna according to an embodiment of the present disclosure.
Figure 8:
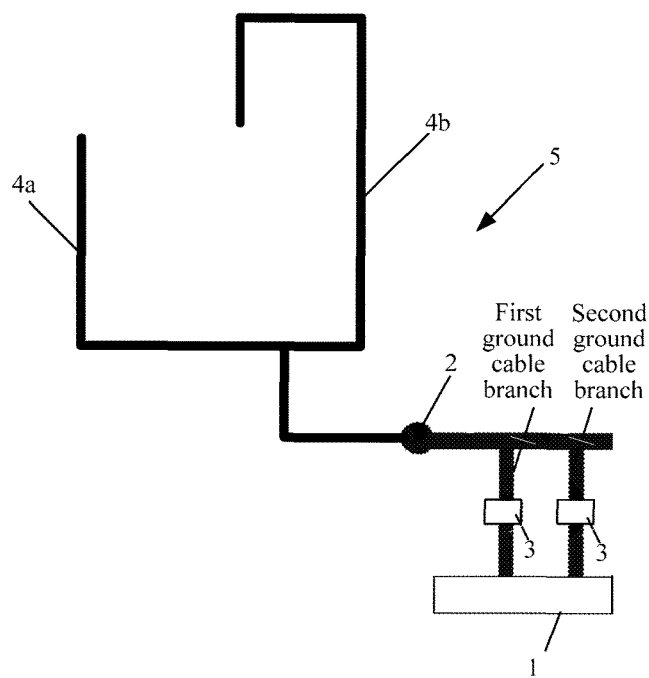
FIG. 8 is a schematic diagram of a multiband antenna according to another embodiment of the present disclosure.

In a second aspect, the present disclosure further provides a multiband antenna shown in FIG. 7 or FIG. 8, including one or more radiating portions with different lengths (radiating portions 4a and 4b shown in FIG. 7 are only exemplary) and a feeding matching apparatus of a multiband antenna, where the feeding matching apparatus of a multiband antenna includes:

a grounding portion 1;

a feeding portion 2 connected to a signal source, where a voltage signal of the signal source is input into the feeding portion 2; and two or more ground cable branches with different lengths, where one end of each ground cable branch is electrically connected to the feeding portion 2, the other end is electrically connected to the grounding portion 1, at least one ground cable branch is connected in series to a signal filtering component 3, the signal filtering component is capable of preventing a signal lower than a frequency point (that is, the lowest cut-off frequency point) corresponding to the signal filtering component from passing through it, and each radiating portion is configured to transmit a signal to the feeding portion 1 in the feeding matching apparatus of a multiband antenna and receive a signal transmitted from the feeding portion 1. For ease of description, a frequency band higher than the frequency point is called a higher frequency band, and a frequency band lower than the frequency point is called a lower frequency band in the following.

When the multiband antenna needs to receive or transmit a signal, more currents flow into a ground cable branch with a shorter length because the ground cable branch with a shorter length has lower impedance. In this way, a signal first passes through the ground cable branch with a shorter length. When a signal reaches the ground cable branch that is connected in series to the signal filtering component, the ground cable branch is capable of enabling a signal in a higher frequency band to pass and preventing a signal in a lower frequency band from passing through it. Therefore, the signal in the lower frequency band will pass through other ground cable branches longer than the ground cable branch. In this way, the lower frequency band better matches a longer ground cable branch, and the higher frequency band better matches a shorter ground cable branch. In addition, the better the matching between an antenna frequency and the length of a ground cable branch of the feeding matching apparatus is (that is, the longer the ground cable branch is, the lower a matching frequency is; or the shorter the ground cable branch is, the higher a matching frequency is), the higher a bandwidth of a certain frequency band in which the antenna operates is and the better operating efficiency is. Therefore, according to this embodiment of the present disclosure, the antenna not only has a higher bandwidth and better operating efficiency when it operates in a lower frequency band but also has a higher bandwidth and better operating efficiency when it operates in a higher frequency band.

It should be noted that, a receiving frequency or a transmitting frequency of the antenna relates to not only the length of the ground cable branch but also the length of the radiating portion. That is to say, a radiating portion with a shorter length matches a higher frequency, and a radiating portion with a longer length matches a lower frequency. Therefore, when the feeding matching apparatus makes the antenna have a higher bandwidth and better operating efficiency in both the low frequency band and the high frequency band, the feeding matching apparatus can better match the radiating portion. This ensures that the radiating portion acquires power of all signals to improve the antenna performance.

For example, with reference to FIG. 7 or FIG. 8, the radiating portion 4a with a shorter length matches a shorter ground cable branch, and the radiating portion 4b with a longer length matches a ground cable branch with a longer length. The radiating portion 4a and the radiating portion 4b may separately match one or more ground cable branches.

For example, if the radiating portion 4a and the radiating portion 4b separately match multiple ground cable branches, when the radiating portion 4a with a shorter length receives or transmits a signal in a high frequency band (for example, signals in the frequency band include signals at three different frequencies), with the function of the signal filtering components 3 that are separately connected in series to the first ground cable branch to the third ground cable branch shown in FIG. 7, the signals at the three different frequencies in the high frequency band separately and correspondingly pass through the first ground cable branch, the second ground cable branch, and the third ground cable branch in descending order of the frequencies. When the radiating portion 4b with a longer length receives or transmits a signal in a low frequency band (for example, signals in the frequency band include signals at three different frequencies), with the function of the signal filtering components 3 that are separately connected in series to the fourth ground cable branch to the sixth ground cable branch shown in FIG. 7, the signals at the three different frequencies in the low frequency band separately and correspondingly pass through the fourth ground cable branch, the fifth ground cable branch, and the sixth ground cable branch in descending order of the frequencies.

As shown in FIG. 8, the signals at the three different frequencies in the high frequency band that are received or transmitted by the radiating portion 4a may simultaneously pass through the first ground cable branch. The signals at the three different frequencies in the low frequency band that are received or transmitted by the radiating portion 4b may simultaneously pass through the second ground cable branch. In this way, the radiating portion 4a and the radiating portion 4b separately match one ground cable branch.

Certainly, if a signal in the high frequency band that is received or transmitted by the radiating portion 4a includes a signal at only one frequency, the signal in the high frequency band that is received or transmitted by the radiating portion 4a may pass through the first ground cable branch. If a signal in the high frequency band that is received or transmitted by the radiating portion 4b includes a signal at only one frequency, the signal in the high frequency band that is received or transmitted by the radiating portion 4b may pass through the second ground cable branch.

The feeding matching apparatus in the multiband antenna may be any one of the previous possible implementation manners, and therefore no further details are provided herein.

In a third aspect, the present disclosure further provides a radio communication device, including the aforementioned multiband antenna. A feeding matching apparatus in the multiband antenna may be any one of the previous possible implementation manners, and therefore no further details are provided.

The radio communication device may be a mobile phone, a tablet computer, a PDA (Personal Digital Assistant, personal digital assistant), a POS (Point of Sales, point of sales), an on-board computer, or the like.

Figure 9:
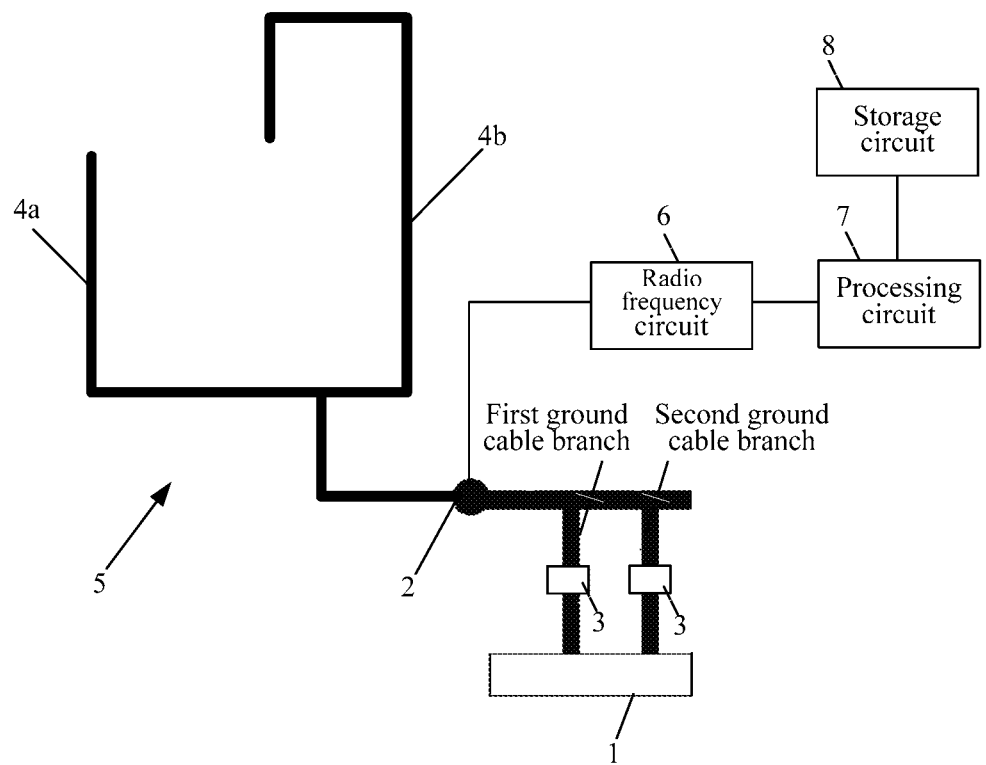
FIG. 9 is a schematic diagram of a radio communication device according to the present disclosure.

An example where the radio communication device is a mobile phone is used for description. As shown in FIG. 9, the mobile phone includes a storage circuit 8, a processing circuit 7, a radio frequency (Radio Frequency, RF for short) circuit 6, an antenna 5, and the like. The RF circuit 6 includes a power divider, a power amplifier, an LNA (Low Noise Amplifier, low noise amplifier), an RF switch, and the like, and the antenna 5 includes the feeding matching apparatus and the radiating portion. When the mobile phone receives a signal, the signal flows from the radiating portion into a feeding portion 2, and the signal simultaneously flows from the radiating portion into ground cable branches. A signal input into the feeding portion 2 flows into the radio frequency circuit and then flows from the radio frequency circuit into the processing circuit 7. The processing circuit 7 runs a software program and a module that are stored in the storage circuit 8 to perform a communications standard or protocol. When the mobile phone transmits a signal, the signal flows from the feeding portion 2 into the radiating portion and simultaneously flows into the ground cable branches, and the radiating portion converts the signal into an electromagnetic signal and radiates it into space.

The signal flowing into the ground cable branches may automatically select matching ground cable branches applicable for the signal by using signal filtering components 3 arranged in different ground cable branches, so that the antenna has a higher bandwidth and better operating efficiency when the antenna operates in a frequency band of the signal.

The performed communications standard or protocol is, for example, GSM (Global System of Mobile Communication), GPRS (General Packet Radio Service), CDMA (Code Division Multiple Access), WCDMA (Wideband Code Division Multiple Access), LTE, email, SMS (Short Messaging Service), or the like.

A person skilled in the art may still clearly know that, the mobile phone may further include an inputting unit, a displaying unit, a sensor, an audio circuit, a WiFi (Wireless Fidelity) module, a Bluetooth module, and the like, although these are not shown in FIG. 9.

It should be understood that, the mobile phone is not limited to the mobile phone structure shown in FIG. 9; and more or less parts than those shown in the figure may be included, some parts may be combined, or different arrangements of components are included.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An antenna comprising:
   at least one radiating portion;
   a grounding portion;
   a feeding portion electrically coupled to the at least one radiating portion configured to transmit a first signal to the feeding portion and receive a second signal transmitted from the feeding portion;
   a first antenna branch, wherein
   a) one end of the first antenna branch is electrically coupled to the feeding portion, and the other end of the first antenna branch is electrically coupled to the grounding portion, and
   b) the first antenna branch is coupled in series to a first signal filtering component that terminates a transmission of a third signal having a frequency lower than a first frequency point of the first signal filtering component; and
   a second antenna branch, wherein
   a) one end of the second antenna branch is electrically coupled to the feeding portion, and the other end of the second antenna branch is electrically coupled to the grounding portion,
   b) the second antenna branch is coupled in series to a second signal filtering component that terminates a transmission of a fourth signal having a frequency lower than a first frequency point of the second signal filtering component; and
   a length of the first antenna branch is shorter than a length of the second antenna branch, and the first frequency point of the first signal filtering component is higher than the first frequency point of the second signal filtering component.

2. The antenna according to claim 1, wherein both the first signal filtering component and the second signal filtering component are high-pass filters.

3. The antenna according to claim 2, wherein at least one of the high-pass filters is an inductor.

4. The antenna according to claim 2, wherein at least one of the high-pass filters is a capacitor.

5. The antenna according to claim 2, wherein at least one of the high-pass filters is formed by connecting in series a capacitor to an inductor.

6. The antenna according to claim 1, wherein the first signal filtering component is a high-pass filter and the second signal filtering component is a band-pass filter, wherein
   a) the second signal filtering component further terminates a transmission of a fifth signal having a frequency higher than a second frequency point of the second signal filtering component, and
   b) the second frequency point of the second signal filtering component is higher than the first frequency point of the second signal filtering component.

7. The antenna according to claim 1, wherein the first signal filtering component is a band-pass filter and the second signal filtering component is a high-pass filter, wherein
   a) the first signal filtering component further terminates a transmission of a sixth signal having a frequency higher than a second frequency point of the first signal filtering component, and
   b) the second frequency point of the first signal filtering component is higher than the first frequency point of the first signal filtering component.

8. The antenna according to claim 1, wherein the first signal filtering component is a band-pass filter and the second signal filtering component is a band-pass filter, wherein
   a) the first signal filtering component further terminates a transmission of a sixth signal having a frequency higher than a second frequency point of the first signal filtering component,
   b) the second frequency point of the first signal filtering component is higher than the first frequency point of the first signal filtering component,
   c) the second signal filtering component further terminates a transmission of a fifth signal having a frequency higher than a second frequency point of the second signal filtering component, and
   d) the second frequency point of the second signal filtering component is higher than the first frequency point of the second signal filtering component.

9. The antenna according to claim 8, wherein the first signal filtering component is an open-circuit line led from the first antenna branch.

10. The antenna according to claim 1, further comprising:
    a third antenna branch, wherein one end of the third antenna branch is electrically coupled to the feeding portion, the other end of the third antenna branch is electrically coupled to the grounding portion;
    wherein a length of the third antenna branch is longer than the length of the first antenna branch and the length of the second antenna branch.

11. A radio communication device comprising an antenna and a radio frequency circuit, wherein the antenna comprises:
    at least one radiating portion;
    a grounding portion;
    a feeding portion electrically coupled to the at least one radiating portion and the feeding portion electrically coupled to the radio frequency circuit, wherein the at least one radiating portion is configured to transmit a first signal to the feeding portion and receive a second signal transmitted from the feeding portion;
    a first antenna branch, wherein
    a) one end of the first antenna branch is electrically coupled to the feeding portion, and the other end of the first antenna branch is electrically coupled to the grounding portion, and
    b) the first antenna branch is coupled in series to a first signal filtering component that terminates a transmission of a third signal having a frequency lower than a first frequency point of the first signal filtering component; and
    a second antenna branch, wherein
    a) one end of the second antenna branch is electrically coupled to the feeding portion, and the other end of the second antenna branch is electrically coupled to the grounding portion, and
    b) the second antenna branch is coupled in series to a second signal filtering component that terminates a transmission of a fourth signal having a frequency lower than a first frequency point of the second signal filtering component; and
    a length of the first antenna branch is shorter than a length of the second antenna branch, and the first frequency point of the first signal filtering component is higher than the first frequency point of the second signal filtering component.

12. The radio communication device according to claim 11, wherein both the first signal filtering component and the second signal filtering component are high-pass filters.

13. The radio communication device according to claim 12, wherein at least one of the high-pass filters is an inductor.

14. The radio communication device according to claim 12, wherein at least one of the high-pass filters is a capacitor.

15. The radio communication device according to claim 12, wherein at least one of the high-pass filters is formed by connecting in series a capacitor to an inductor.

16. The radio communication device according to claim 11, wherein the first signal filtering component is a high-pass filter and the second signal filtering component is a band-pass filter, wherein
   a) the second signal filtering component further terminates a transmission of a fifth signal having a frequency higher than a second frequency point of the second signal filtering component, and
   b) the second frequency point of the second signal filtering component is higher than the first frequency point of the second signal filtering component.

17. The radio communication device according to claim 11, wherein the first signal filtering component is a band-pass filter and the second signal filtering component is a high-pass filter, wherein
   a) the first signal filtering component further terminates a transmission of a sixth signal having a frequency higher than a second frequency point of the first signal filtering component, and
   b) the second frequency point of the first signal filtering component is higher than the first frequency point of the first signal filtering component.

18. The radio communication device according to claim 11, wherein both the first signal filtering component and the second signal filtering component are band-pass filters, wherein
   a) the first signal filtering component further terminates a transmission of a sixth signal having a frequency higher than a second frequency point of the first signal filtering component,
   b) the second frequency point of the first signal filtering component is higher than the first frequency point of the first signal filtering component,
   c) the second signal filtering component further terminates a transmission of a fifth signal having a frequency higher than a second frequency point of the second signal filtering component, and
   d) the second frequency point of the second signal filtering component is higher than the first frequency point of the second signal filtering component.

19. The radio communication device according to claim 18, wherein the first signal filtering component is an open-circuit line led from the first antenna branch.

20. The radio communication device according to claim 18, further comprising:
   a third antenna branch, wherein one end of the third antenna branch is electrically coupled to the feeding portion, the other end of the third antenna branch is electrically coupled to the grounding portion;
   wherein a length of the third antenna branch is longer than the length of the first antenna branch and the length of the second antenna branch.

* * * * *